United States Patent [19]

Heinzman

[11] Patent Number: 6,016,143
[45] Date of Patent: *Jan. 18, 2000

[54] MULTI-DEVICE DIRECT I/O OBJECT THAT GENERATES TRANSACTIONS CAPABLE OF CONTROLLING MULTIPLE INSTRUMENTS AND TRANSACTION DIALOG BOXES HAVING DEVICE AND ADDRESS FIELDS

[75] Inventor: William Heinzman, Boulder, Colo.

[73] Assignee: Hewlett Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,118

[22] Filed: Dec. 29, 1995

[51] Int. Cl.⁷ ........................................ G06F 3/00
[52] U.S. Cl. ................... 345/339; 345/333; 345/347; 345/348; 345/352; 345/965; 345/967; 345/970
[58] Field of Search ............................ 395/821, 855; 345/339, 347, 348, 352, 349, 970, 965, 967, 333, 353

[56] References Cited

U.S. PATENT DOCUMENTS

| | | | |
|---|---|---|---|
| 4,604,690 | 8/1986 | Crabtree et al. | 395/653 |
| 4,901,221 | 2/1990 | Kodosky et al. | 345/348 |
| 5,301,336 | 4/1994 | Kodosky et al. | 345/348 |
| 5,313,574 | 5/1994 | Beethe | 345/356 |
| 5,347,628 | 9/1994 | Brewer et al. | 345/351 |
| 5,361,336 | 11/1994 | Atchison | 345/335 |
| 5,377,318 | 12/1994 | Wolber | 345/347 |
| 5,437,007 | 7/1995 | Bailey et al. | 345/349 |
| 5,551,041 | 8/1996 | Beethe | 395/733 |
| 5,640,572 | 6/1997 | Mondrik et al. | 395/735 |
| 5,659,749 | 8/1997 | Mitchell et al. | 395/678 |
| 5,684,945 | 11/1997 | Chen et al. | 395/182.18 |
| 5,764,988 | 6/1998 | Govindaraj | 395/702 |
| 5,821,934 | 10/1998 | Kodosky et al. | 345/349 |

OTHER PUBLICATIONS

Microsoft, Windows 95 Resource Kit, Microsoft Press, pp. 599–614, 1995.

National Instruments, "Instrumentation Reference and Catalogue", pp. I–59 thru I–62, 1995.

J. Barbar, H. Reams & T. Keely, "Test Executive Now Works with LabVIEW for Windows to Simplify Automated Test Programs", IAC New Prod. Annou., Austin, TX, Jul. 15, 1993.

Primary Examiner—Eddie P. Chan
Assistant Examiner—Hong Kim

[57] ABSTRACT

An icon in a graphical programming language that will communicate with many different instruments. The Multi-Device Direct I/O object allows the control of multiple instruments using the instruments's built-in commands. The Multi-Device Direct I/O object (icon) allows each separate transaction within the object to address a separate instrument. The I/O Transaction dialog box associated with each transaction contains two new fields, a device field and an address field. The device field contains the name of all of the currently configured instruments or devices. The address field has two modes: Default Address and Address. The Default Address mode chooses the address entered in the Configure I/O dialog box. The Address mode causes the user to enter in another address or a variable or expression that evaluates to a valid address. The Multi-Device Direct I/O object allows for any instrument, on any interface (i.e., GPIB, RS232, and VXI interface) and can handle multiple I/O paths.

28 Claims, 10 Drawing Sheets

MULTI-DEVICE DIRECT I/O OBJECT THAT GENERATES TRANSACTIONS CAPABLE OF CONTROLLING MULTIPLE INSTRUMENTS AND TRANSACTION DIALOG BOXES HAVING DEVICE AND ADDRESS FIELDS

CROSS-REFERENCE TO OTHER APPLICATIONS

The following applications are of common assignee and contain some common disclosure.

"Instrument Descriptor (ID) Monitor," Attorney Docket No. 10950822-1 (1245.1990000), Ser. No. 08/580,550, filed Dec. 29, 1995, now issued U.S. Pat. No. 5,754,426, issued May 19, 1998, incorporated herein by reference in its entirety;

"A To/From Socket Object," Attorney Docket No. 10950819-1 (1245.2000000), Ser. No. 08/581,123, filed Dec. 29, 1995, for which a Continued Prosecution Application was filed on Jan. 7, 1998, incorporated herein by reference in its entirety;

"A Callable Graphical Programming Language," Attorney Docket No. 10950826 (1245.2020000), Ser. No. 08/581, 124, filed Dec. 29, 1995, for which a Continued Prosecution Application was filed on Jan. 7, 1998, incorporated herein by reference in its entirety.

BACKGROUND OF THE INVENTION

1. Field of the Invention

The present invention relates generally to the field of graphical programming languages, and more particularly, to an icon in a graphical programming language that will communicate with many different instruments.

2. Related Art

In textual languages such as C, PASCAL, or BASIC, one programs using keywords following rules of syntax. In a graphical language, one connects icons together using a mouse to generate a program resembling a data flow diagram. Hewlett Packard Visual Engineering Environment (HP VEE) for Windows is a graphical programming language designed for test and measurement applications.

In HP VEE, one programs by selecting objects (icons) from menus, placing those objects within a working area environment, and connecting them together using a mouse. The lines connecting the objects carry data or control signals.

HP VEE provides two easy ways to control instruments: instrument drivers and the Direct I/O object. Instrument drivers are user interfaces that control an instrument from a computer screen. With a driver one does not need to know the unique software commands that control a particular instrument. Once the instrument has been set up using menu selections and dialog boxes, the driver will automatically send the right command strings over the bus.

With the Direct I/O object, one has to know the instrument command strings. HP VEE provides a convenient method of transmitting commands and receiving data. Using Direct I/O one can communicate with any instrument that connects to one of the supported interfaces, such as GPIB, RS-232, or VXI interfaces.

Although instrument drivers provide maximum ease-of-use and save development time, they are not always available. With the Direct I/O one can communicate with any instrument from any vendor over standard interfaces. Although it requires slightly more effort than an instrument driver, the Direct I/O yields faster execution speeds.

HP VEE's current Direct I/O object is configured for only one device. Controlling several instruments at a time means having to use several Direct I/O objects.

SUMMARY OF THE INVENTION

The present invention is directed toward an icon for a graphical programming language that communicates with many different instruments. The present invention allows the control of multiple instruments using each instrument's built-in commands using a single icon. The present invention can control any instrument, on any interface and can handle multiple I/O paths, such as RS232, GPIB, and VXI interfaces. The present invention optimizes icon-to-icon interpretation time by reducing the number of icons needed when controlling different instruments. The requirement of having a separate Direct I/O object for each instrument is eliminated.

The present invention allows one to read and write arbitrary data to instruments in much the same way you read from and write to files. The present invention, the Multi-Device Direct I/O object, is a standard transaction object. A transaction is simply a specification for a low-level input or output operation, such as reading and writing data. Each transaction appears as a line of text listed in the open view of the Multi-Device Direct I/O object. The present invention expands the I/O Transaction dialog box used in the Direct I/O object by adding two new fields, a device field and an address field. The device field menu contains the name of all of the currently configured instruments or devices. The address field has two modes: a Default Address mode and an Address mode. The Default Address mode chooses the default address entered in the Device Configuration I/O dialog box. Before an instrument can be accessed by HP VEE, the instruments name, type of interface (e.g., GPIB, RS232, or VXI interface), address, the timeout (the maximum number of seconds allowed without an instrument response before getting an error message), and byte ordering (the order the device uses for reading and writing binary data, i.e., most significant byte first or least significant byte first) must be entered in the Device Configuration I/O dialog box. The Address mode, when selected, causes a fill-in field to pop-up. The user then enters another address or a variable or expression that evaluates to a valid address for that particular device.

The I/O Transaction dialog box for the Multi-Device Direct I/O object will only allow transactions to be entered that support the chosen device. If the transaction dialog box is configured for a particular type of transaction and the device is changed, then the transaction, if illegal for that device, will be changed to the last valid transaction for that device type.

BRIEF DESCRIPTION OF THE DRAWINGS

The present invention will be described with reference to the accompanying drawings, wherein.

DETAILED DESCRIPTION OF THE INVENTION

The preferred embodiment of the present invention is discussed in detail below. While specific configurations are discussed, it should be understood that this is done for illustration purposes only. A person skilled in the relevant art will recognize that other components and configurations may be used without departing from the spirit and scope of the invention.

The present invention is an icon in a graphical programming language that communicates with many different instruments. Although the present invention is described in terms of HP VEE, the present invention is also applicable to other graphical programming languages. The present invention allows the control of many different instruments using one Multi-Device Direct I/O object in a graphical programming environment.

Throughout the application reference is made to the user clicking and double clicking an object. Clicking refers to the user positioning the mouse pointer over the desired object and clicking the mouse once. Double clicking refers to the user positioning the mouse pointer over the desired object and clicking the mouse twice.

Figure 1:
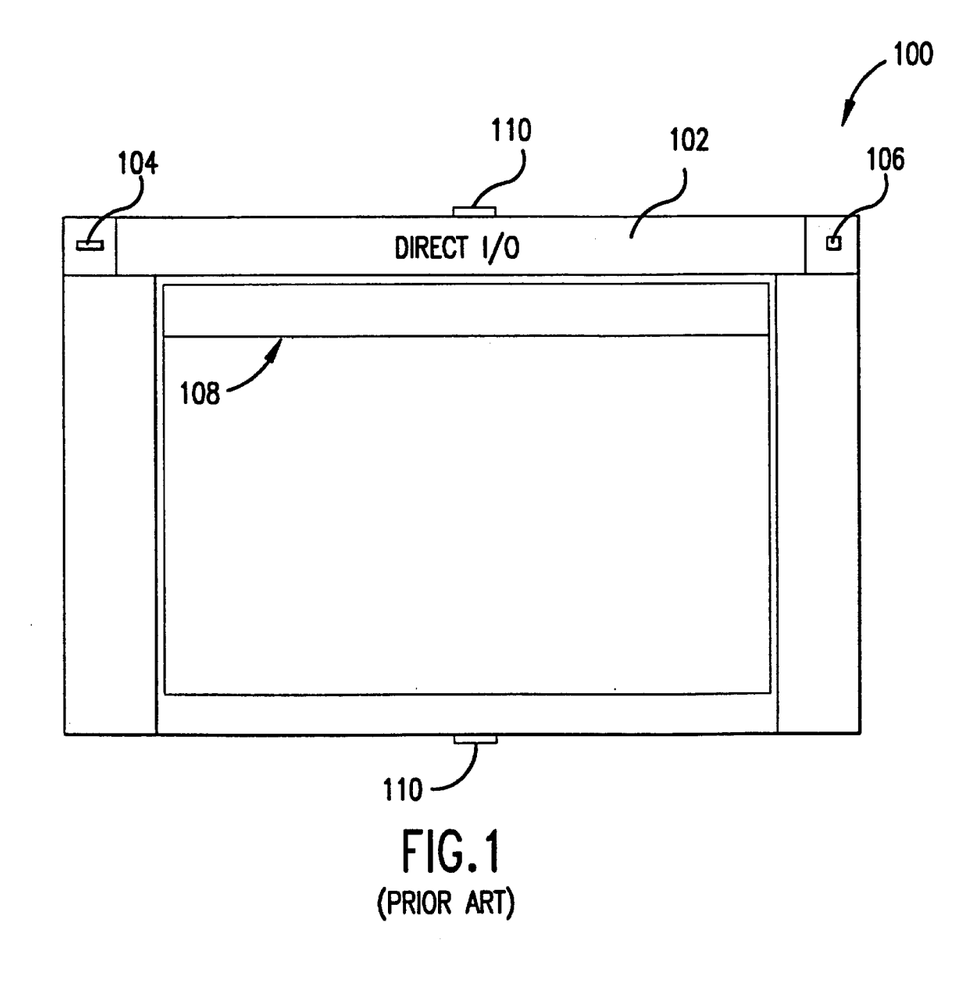
FIG. 1 illustrates the current Direct I/O object.

Prior to describing the invention in detail, a simplified description of the current Direct I/O object is provided. FIG. 1 is a block diagram illustrating the current Direct I/O object 100. The Direct I/O object 100 comprises a title bar 102, a horizontal bar in the upper left-hand corner of the title bar 104, a square bar in the upper right-hand corner of the title bar 106, and a blank transaction 108. The title bar 102 for a Direct I/O object can be edited for the insertion of the name of instrument that the Direct I/O object is controlling. The horizontal bar 104 is used to access the object menu. The object menu provides a means of editing the respective object, i.e., adding a transaction, deleting a transaction, inserting a transaction, cloning the Direct I/O object, etc. The square bar 106 is used to switch the object between iconic and open view. The sequence pins 110 are located on the top and bottom of the Direct I/O object 100 to control the order in which the object executes. The transaction 108, shown as a blank transaction, is a specification for a low-level input or output operation, such as a read data or write data operation. Every transaction 108 appears as a line of text listed in the open view of the Direct I/O object 100. To view a transaction 108, the user double clicks on the transaction 108 to expand it to an I/O Transaction dialog box.

Figure 2:
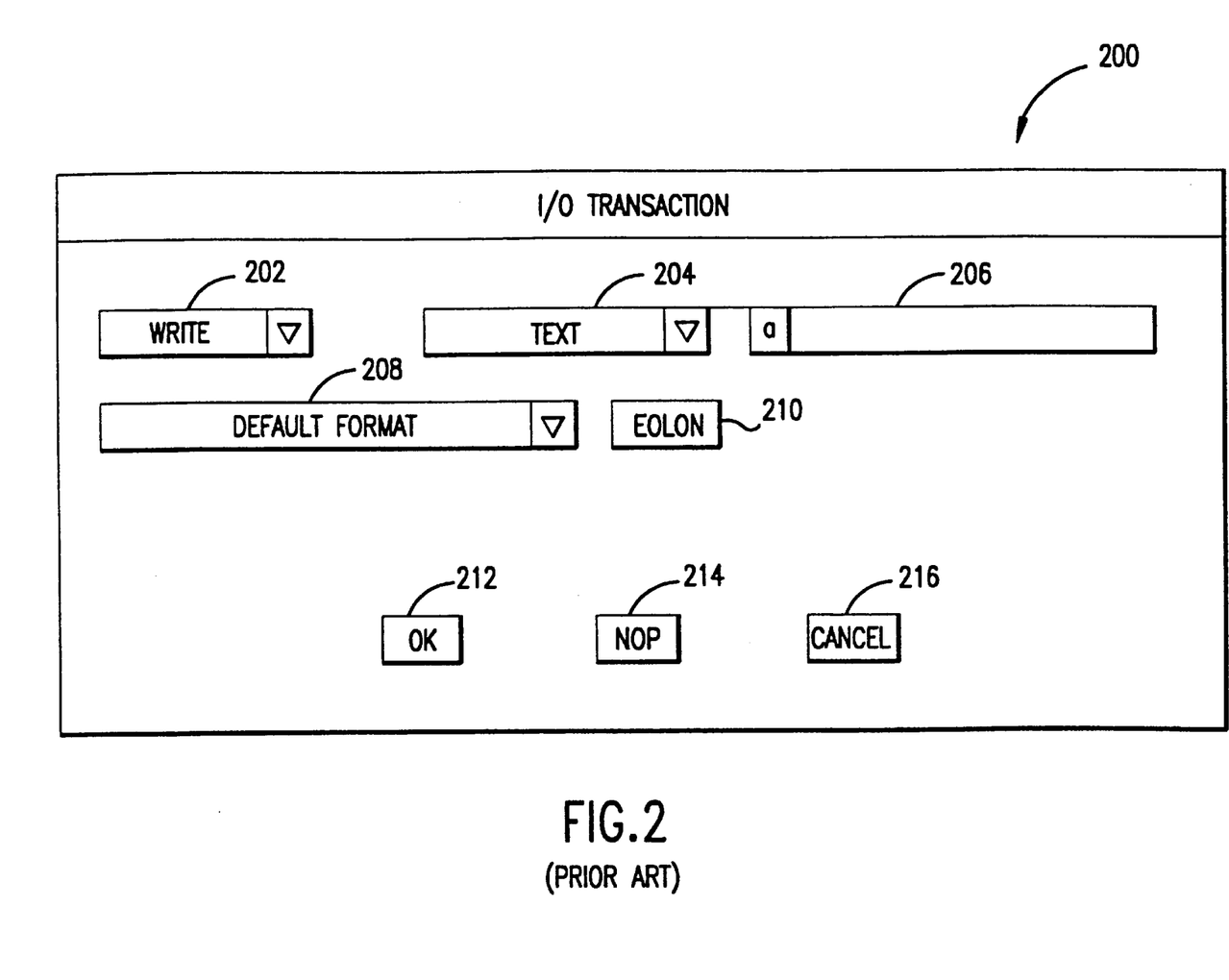
FIG. 2 illustrates an I/O transaction dialog box for the current Direct I/O object.

FIG. 2 illustrates an I/O Transaction dialog box 200 for the Direct I/O object 100. The button labeled WRITE 202 holds a menu. Other entries in the menu include READ, EXECUTE, and WAIT. If one is writing data to an instrument, the WRITE instruction is selected. If one is reading data from an instrument, the READ instruction is selected. The next field 204 designates the encoding of the instruction. The encoding of the instruction can be TEXT, BINARY, BINBLOCK, and CONTAINER. The data field 206 holds the actual instruction for the specific instrument. Since instructions are unique to each instrument, no menu is provided for this field. Field 208 specifies the format of the data, i.e., string, integer, octal, hex, real, complex, etc. The EOL ON/OFF button 210 indicates whether an end-of-line character will append to the end of the instruction. The OK button 212 maps the fields in the I/O Transaction dialog box 200 to the mnemonics that appear in the transaction 108 listed in the open view. The NOP button 214 saves the latest settings shown in the dialog box, but it also makes that transaction a "no operation" or a "no op." Its effect is the same as commenting out a line of code in a computer program. The Cancel button 216 cancels the changes that were edited.

Figure 3:
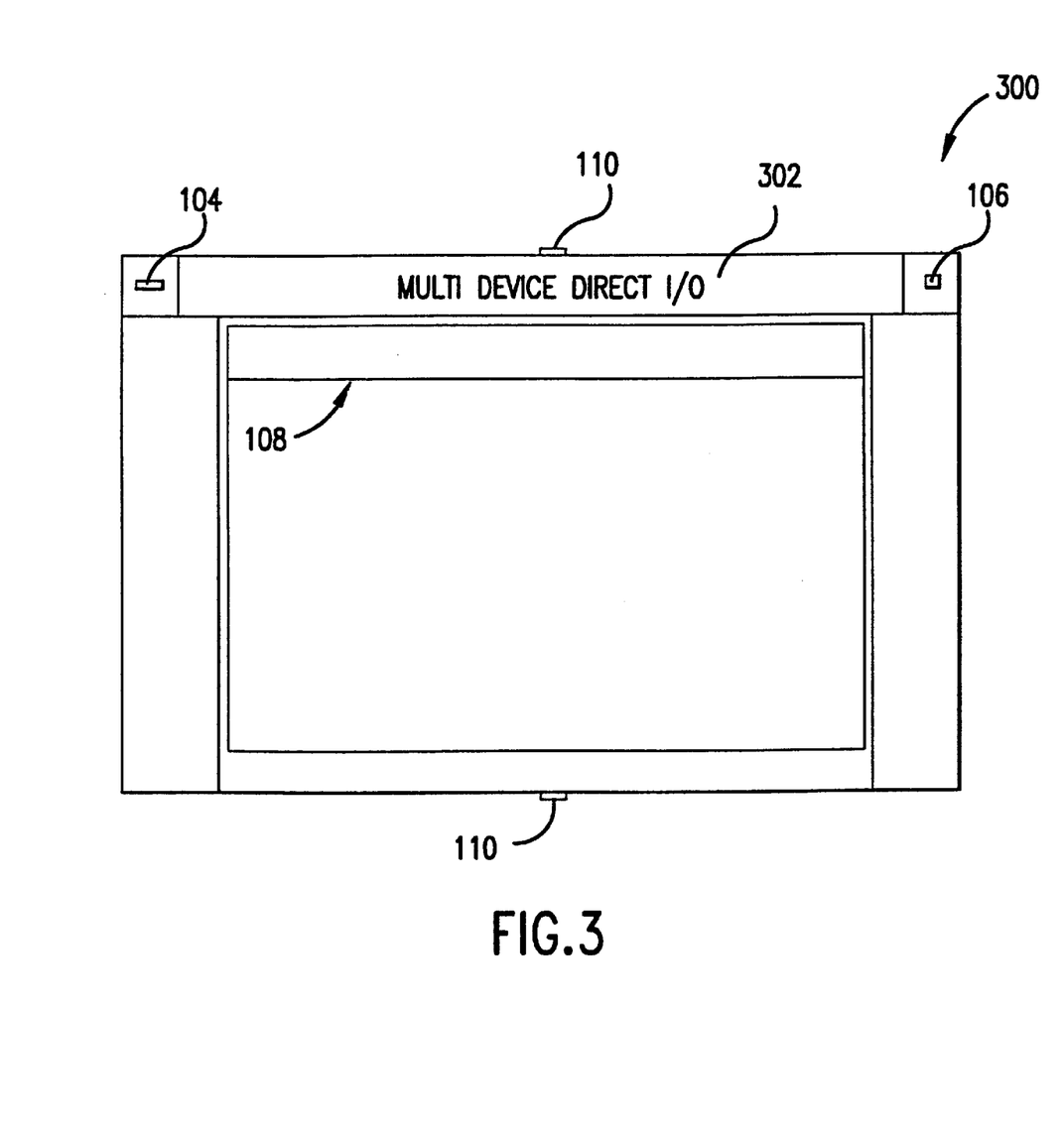
FIG. 3 illustrates a preferred embodiment of the Multi-Device Direct I/O object.

The Multi-Device Direct I/O object 300 is shown in FIG. 3. It resembles the Direct I/O object 100 except for the title bar 102. The Multi-Device Direct I/O object 300 comprises a title bar 302, a horizontal bar in the upper left-hand corner of the title bar 104, a square bar in the upper right-hand corner of the title bar 106, and a blank transaction 108. The title bar 302 for the Multi-Device Direct I/O object 300 does not reflect a particular instrument as the Direct I/O object 100 is capable of doing. Each transaction 108 within the Multi-Device Direct I/O can address a different instrument. The remaining elements of the Multi-Device Direct I/O object 300 are functionally equivalent to the corresponding elements of the Direct I/O object 100.

Figure 4:
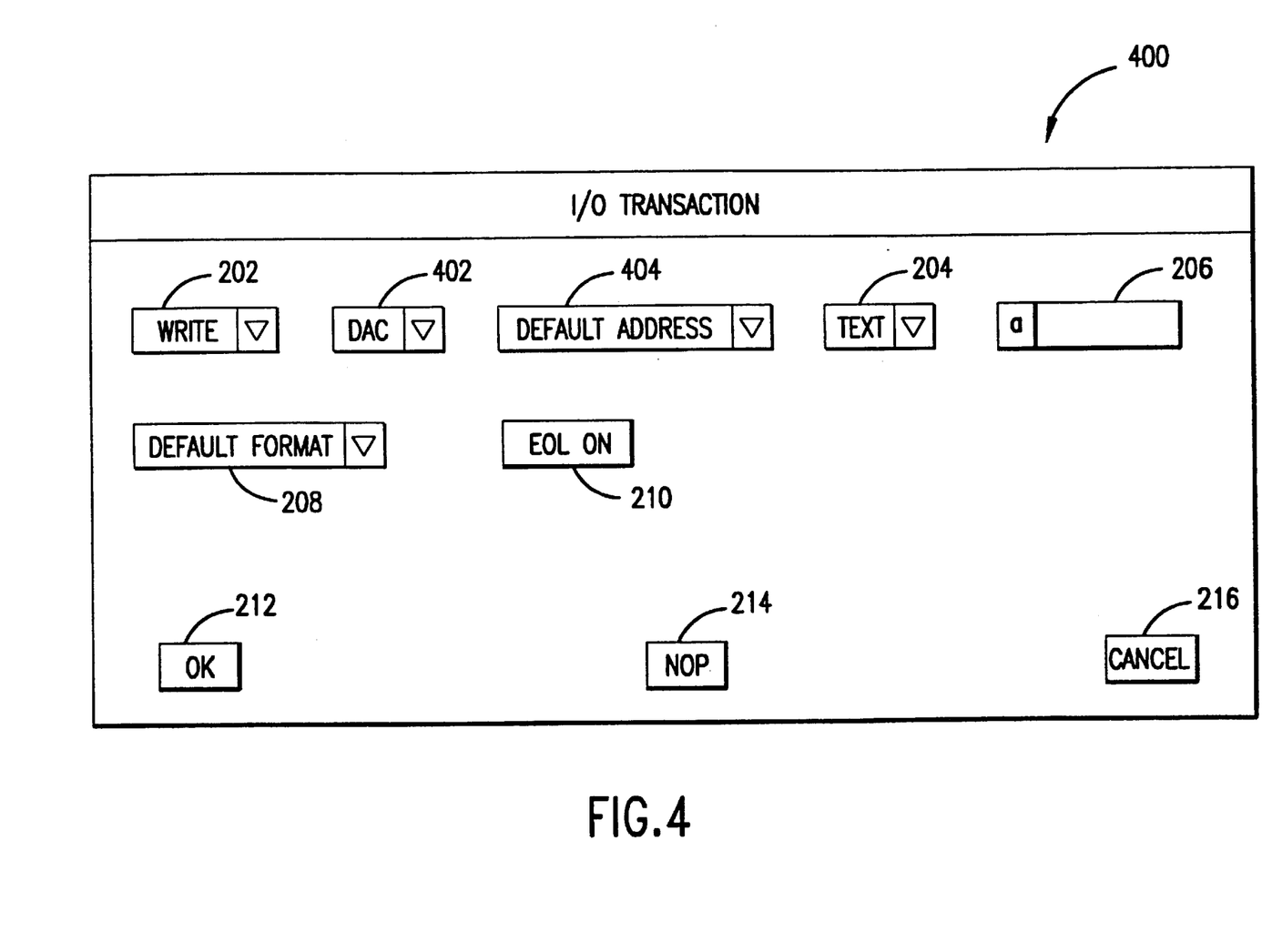
FIG. 4 illustrates an I/O transaction dialog box for the Multi-Device Direct I/O object.

The I/O Transaction dialog box 400 for the Multi-Device Direct I/O object 300 is shown in FIG. 4. The I/O Transaction dialog box 400 provides two new fields, a device field 402 and an address field 404. The device field 402 contains the names of all of the currently configured devices in its menu. The I/O Transaction dialog box 400 will only allow transactions that are supported by the chosen device. For example, if the chosen device is controlled via the VXI backplane then the user is allowed to configure a REGISTER or MEMORY access. If the I/O Transaction dialog box 400 is configured for a particular type of transaction 108 and the device is changed, then the transaction 108, if illegal for that device, will be changed to the last valid transaction 108 for that device type. The address field 404 has two modes: a Default Address mode and an Address mode. The Default Address mode causes the default address entered in the Configure I/O dialog box to be used. The Address mode, when chosen, causes a fill-in field (not shown) to appear. The fill-in field allows the user to enter in another address or a variable or expression that evaluates to a valid address. The remaining fields 202–216 of the I/O Transaction dialog box 400 are identical to the fields 202–216 of the I/O Transaction dialog box 200.

Figure 5:
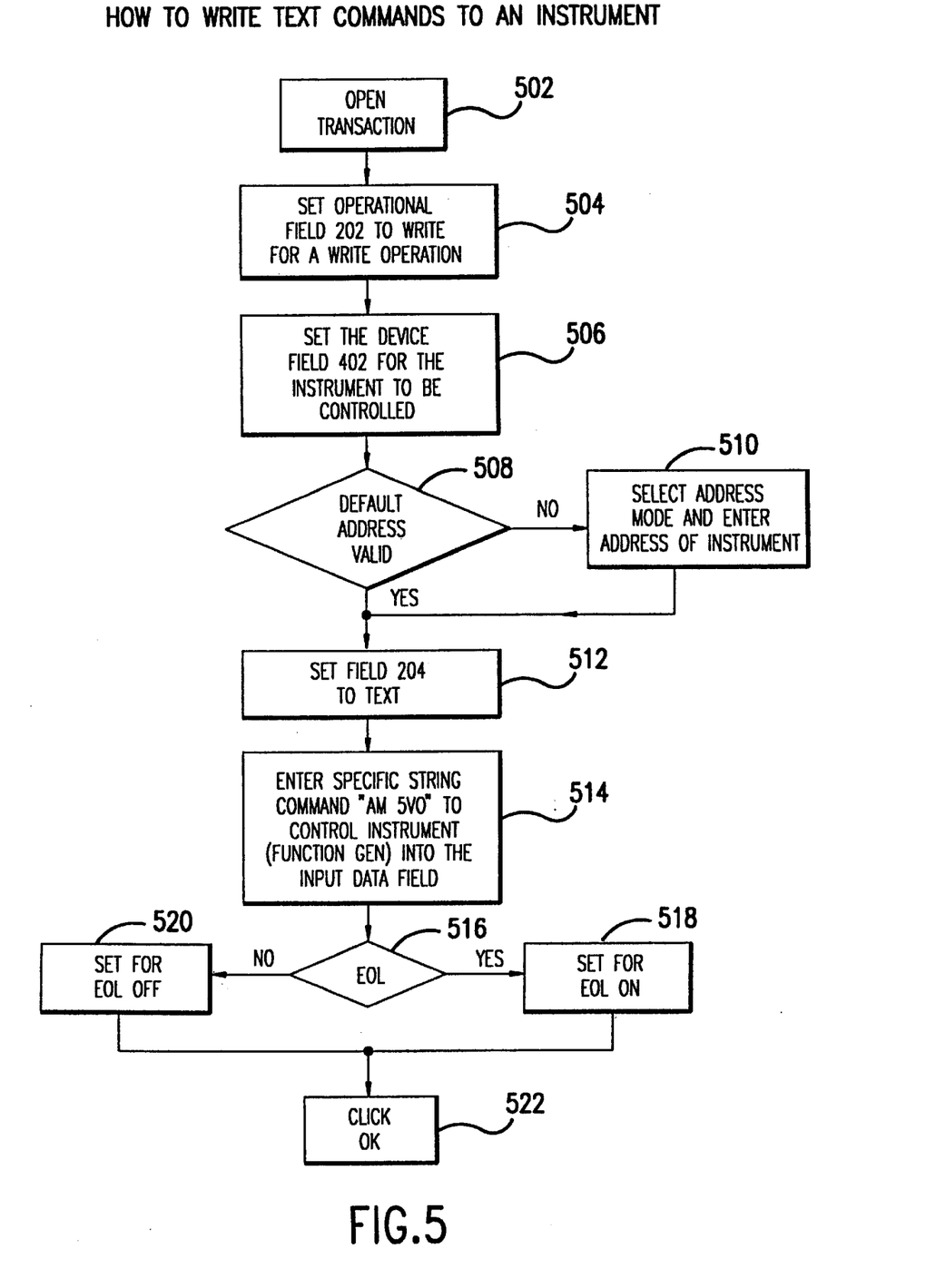
FIG. 5 illustrates a flow diagram of how to write text commands to an instrument.

FIG. 5 represents a flow diagram of how to write text commands to an instrument. For demonstration purposes, flow diagram 500 is an example of a write command to an HP3325B Function Generator to set the amplitude to 5 volts. The command string for this instruction is "AM 5 VO". After configuring the instrument for Direct I/O using the Configure I/O dialog box, the following occurs.

Step 502 requires the user to click the transaction 108 to open the I/O Transaction dialog box 400. The fields 202–210, 402 and 404 within the I/O Transaction dialog box 400 can be set in any order. For simplicity, the order described in the flow diagram 500 progresses from left to right starting at the first row.

The operation field 202 should be set to perform a WRITE operation. If the WRITE operation does not appear in the operation field 202, step 504 requires that the menu be pulled down and the WRITE operation be selected from the menu.

When selecting the instrument device from the device field 402 (step 506), pull down the menu and select the appropriate instrument. Note that the instrument will not appear in the menu unless the instrument has been configured for Direct I/O.

If the default address is not valid, step 508 transfers control to step 510 where the user must toggle the address field 404 to be able to fill-in the address of the instrument. Once the user has entered the appropriate instrument address, control passes to step 512. If the default address is valid, control passes to step 512.

In step 512, the user must select the type of encoding used by the instruction. For this example, field 204 should be set to TEXT. The specific string command is then entered into the input data field during step 514. For the present example the string command is "AM 5 VO". If an EOL character is required (step 516) then the EOL ON/OFF field 210 should be in the EOL ON position (step 518). If the EOL character is not required, step 520 requires that the EOL ON/OFF field 210 be in the EOL OFF position.

Step 522 calls for the user to map the fields 202–210, 402 and 404 in the I/O Transaction dialog box 400 directly to the transaction. This is accomplished by clicking the OK button 212.

Figure 6:
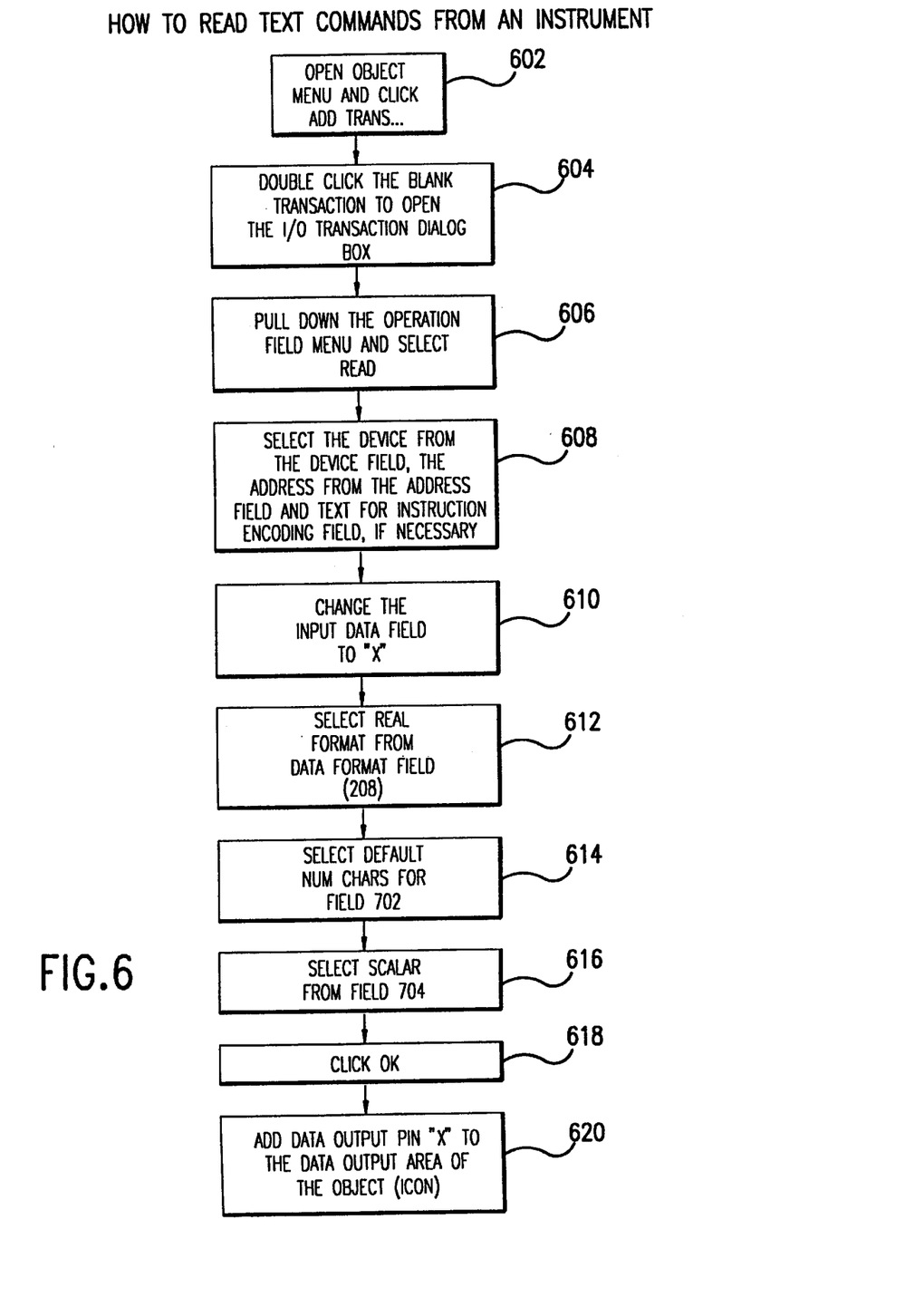
FIG. 6 illustrates a flow diagram of how to write text commands from an instrument.

FIG. 6 represents a flow diagram of how to read data from an instrument using text commands. For demonstration purposes, flow diagram 600 is an example of a read command that reads measurements from an HP3478A Multimeter. Two commands are needed to take a measurement with the multimeter. First, the multimeter must be triggered. This command is a WRITE command. The actual string to be entered in the input data field 206 is "T5". The next command is a READ command. The command string for this instruction is "X". After configuring the digital multimeter (dmm) instrument for Direct I/O using the Configure I/O dialog box and generating a WRITE transaction to trigger the dmm according to the flow diagram of FIG. 5, the following occurs.

A new transaction 108 must be generated. Step 602 requires that the object menu be opened and the selection Add Trans . . . be clicked. This will add a new blank transaction 108 under the WRITE transaction 108 to trigger the dmm.

Step 604 requires double clicking on the blank transaction 108 to open the I/O Transaction dialog box 400. Again, the fields within the I/O Transaction dialog box 400 can be edited in any order, but for simplicity, the flow diagram moves from left to right beginning with the first row.

Step 606 selects the READ operation from the pull down menu of operation field 202. When the READ operation is selected, new buttons appear in the I/O Transaction box (shown in FIG. 7).

Selection of the dmm device, its associated address, and the input data field 406 being encoded in TEXT format (by selecting TEXT in field 204) have all been made within fields 402, 404, and 204 when the WRITE transaction to trigger the dmm was generated. Therefore, these fields 402, 404, and 204 should not need to be changed. If for some reason they are not correct, step 608 allows the user to correct these fields (402, 404, and/or 204).

Step 610 requires the user to input "X" as the variable name for the data being read from the dmm for input data field 206. Data returned from an instrument is sent to data output pins. A data output pin will be inserted a bit further down the flow diagram. The dmm returns single readings as real numbers, therefore, step 612 selects REAL FORMAT from the data field format 208.

Figure 7:
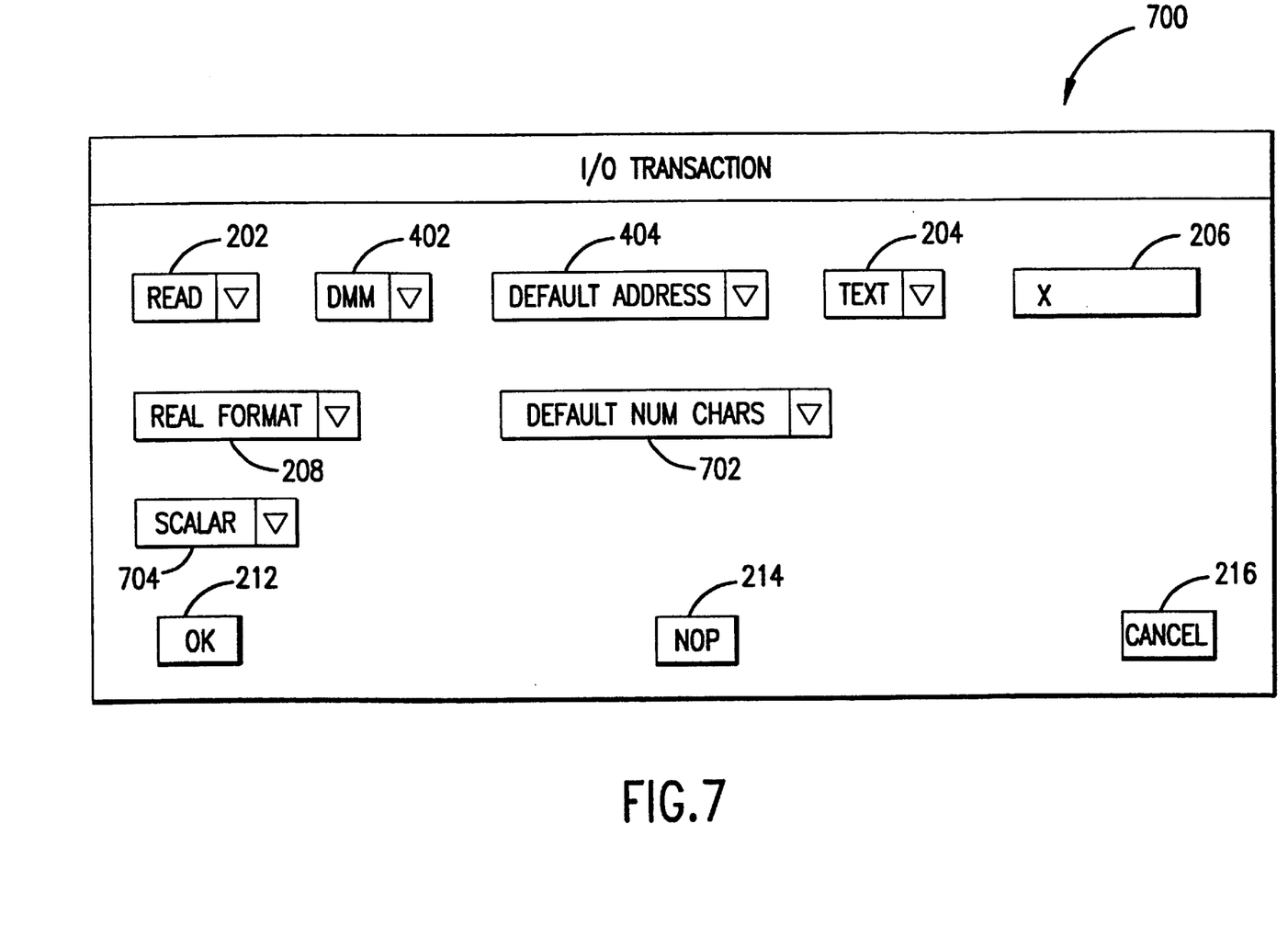
FIG. 7 illustrates an I/O transaction dialog box for a READ operation using the Multi-Device Direct I/O object.

FIG. 7 displays the new fields generated by the selection of the READ operation from field 202. The first new field is the number of characters field 702. The default for the number of characters is 20. For the present example 20 is adequate. Therefore, step 614 requires that DEFAULT NUM CHARS be selected from the menu of field 702. The next field (field 704 in FIG. 7) determines how the instrument returns data, i.e., as a scalar or as an array. For this example the data is returned from the dmm as a scalar, therefore, step 616 requires that SCALAR be selected from the menu of field 704.

Step 618 generates the transaction 108 by clicking the OK button 212. The last step 620 requires data output pin X for the returned measurement to be placed in the data output area of the icon. This is generated by pressing Ctrl-a.

Figure 8:
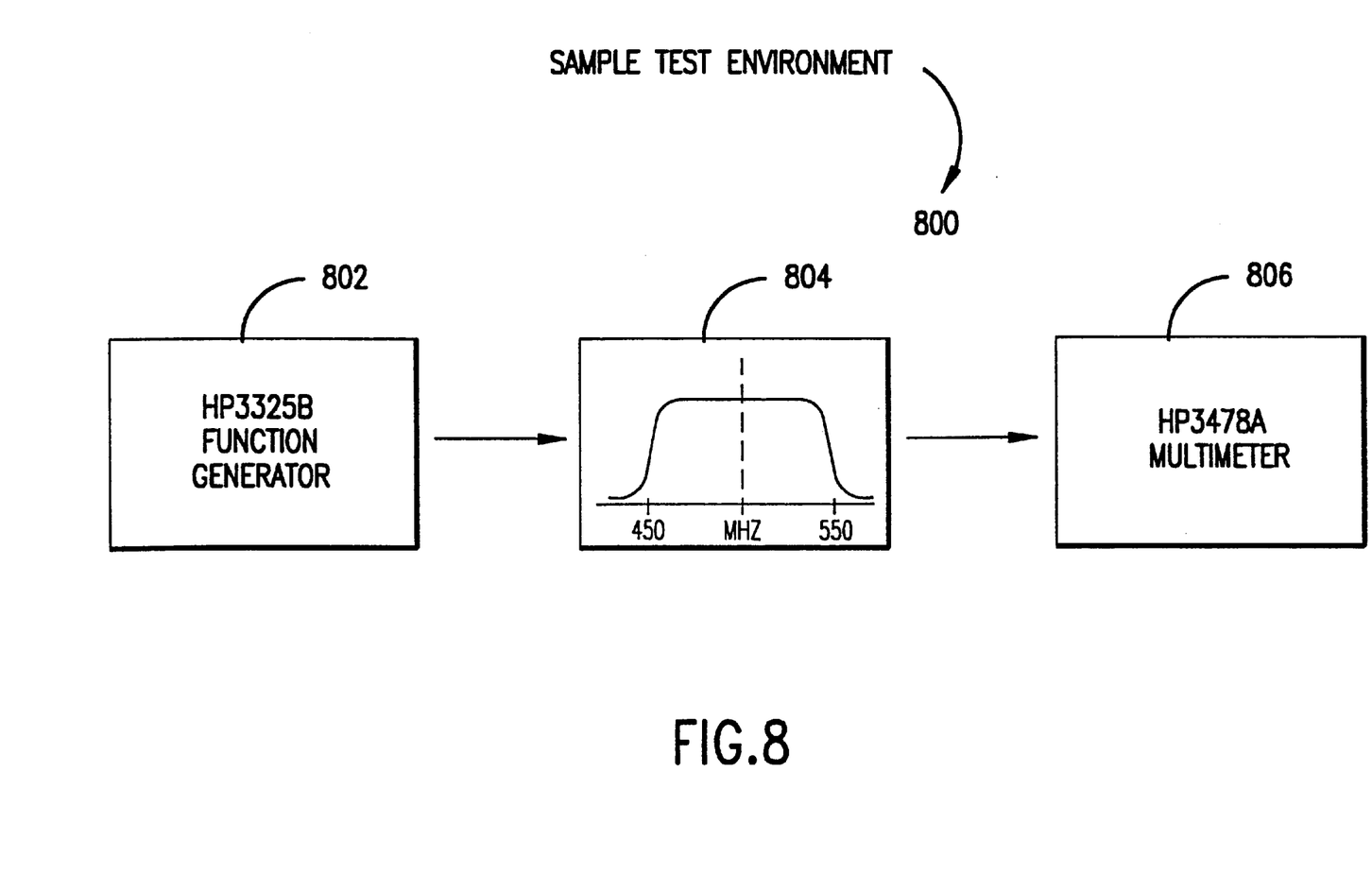
FIG. 8 illustrates a sample test environment in which an embodiment of the present invention can be employed.

Prior to defining how the Multi-Device Direct I/O object communicates with many different instruments, a simplified sample test environment is provided. FIG. 8 is a block diagram 800 illustrating a test setup that measures a 100 MHZ Bandpass Filter 804. Frequencies are injected into the Bandpass Filter 804 using an HP3325B Function Generator 802. The output of the Bandpass Filter 804 is connected to an HP3478A Multimeter 806 for measuring filter characteristics of the Bandpass Filter 804.

The present invention is described in terms of the above example test environment. Description in these terms is provided for convenience only. It is not intended that the invention be limited to application in this example test environment. In fact, after reading the following description, it will become apparent to a person skilled in the relevant art how to implement the invention with other test setups employing different instruments and different levels of test environment complexities.

Figure 9:
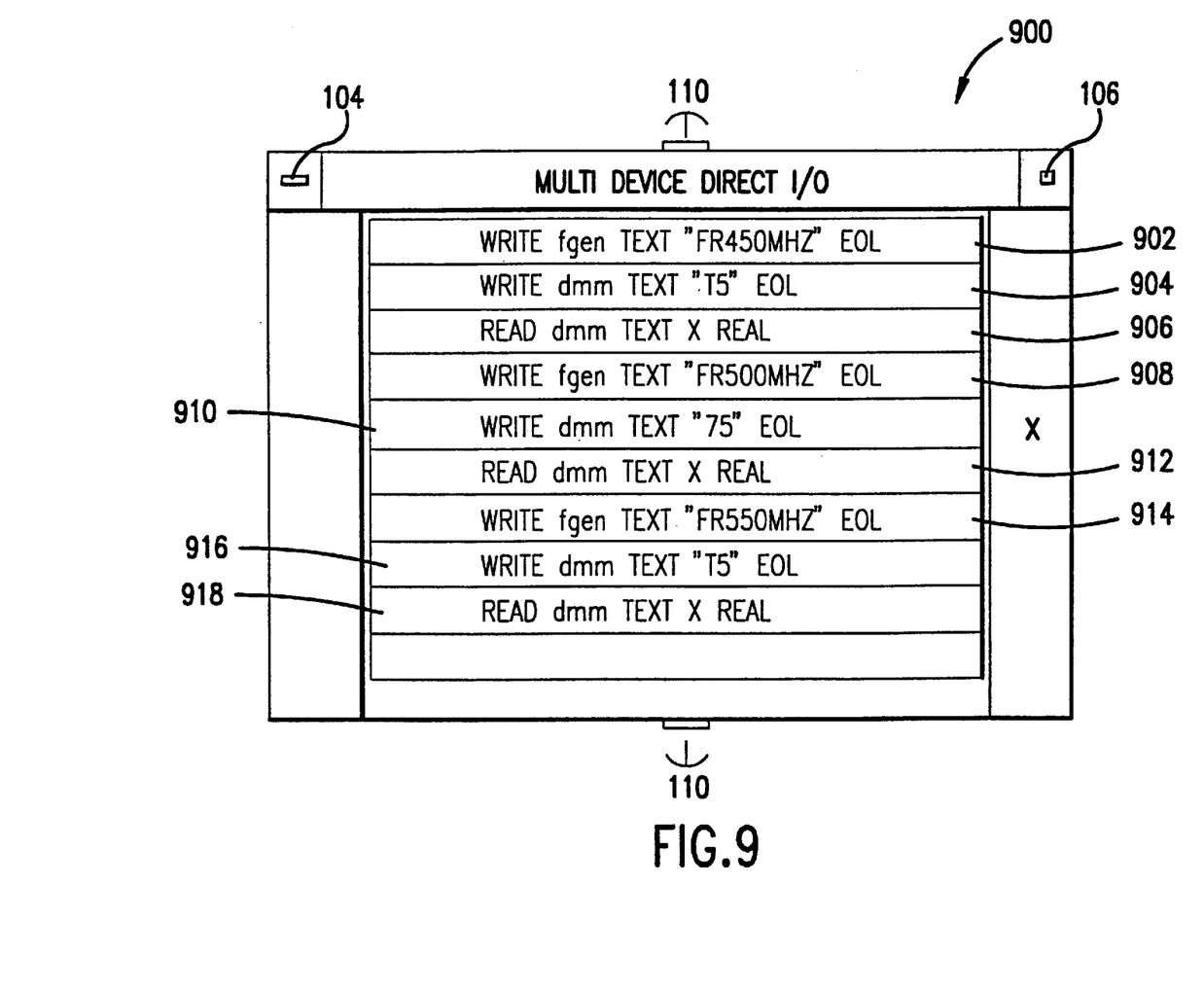
FIG. 9 illustrates programming the Multi-Device Direct I/O object for the sample test environment.

FIG. 9 illustrates an embodiment of the present invention used to extract amplitude measurements of the Bandpass Filter 804 at frequencies ranging from 450 MHZ to 550 MHZ in 50 MHZ steps. Transactions 902, 908, and 914 inject 450, 500, and 550 MHZ signals into Bandpass Filter 804. The digital multimeter 806 needs to be triggered before reading a measurement. Transactions 904, 910, and 916 trigger the digital multimeter 806. An amplitude measurement is read into variable X using transactions 906, 912, and 918. When the Multi-Device Direct I/O object 900 executes, each transaction 902–918 is executed in the order in which it appears within the object 900.

The above test using test setup 800 would have needed at least two Direct I/O objects 100. With the present invention, only one Multi-Device Direct I/O object is needed. Each separate transaction, with the present invention, can address the same instrument or a separate instrument. This reduces the number of icons and optimizes the icon-to-icon interpretation time, allowing for faster control of instruments.

Figure 10:
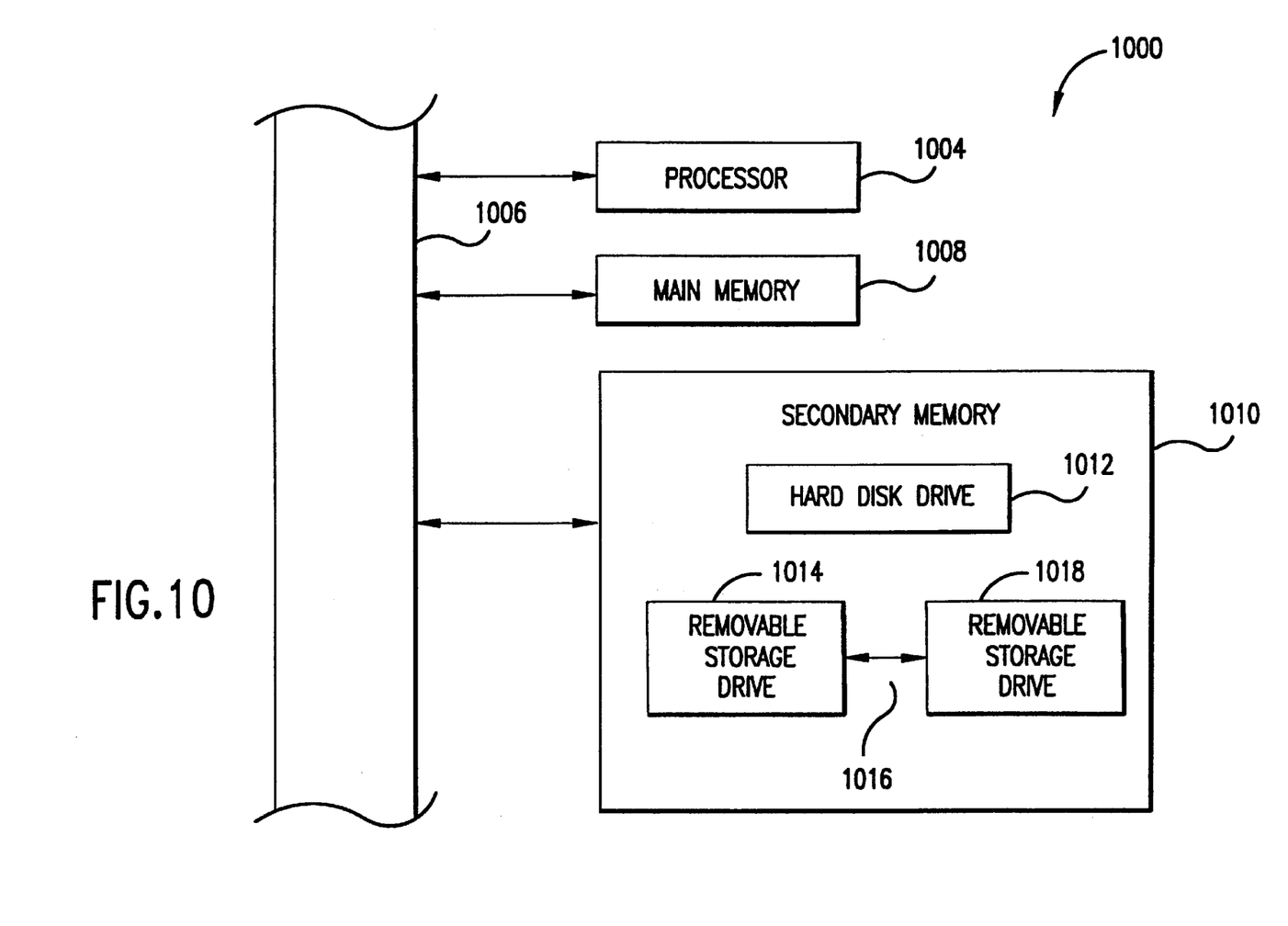
FIG. 10 illustrates an exemplary computer system to which the present invention is directed.

In one embodiment, the present invention is directed to a computer system operating as discussed herein. An exemplary computer system 1000 is shown in FIG. 10. The computer system 1000 includes one or more processors, such as processor 1004. The processor 1004 is connected to a communication bus 1006.

The computer system 1000 also includes a main memory 1008, preferably random access memory (RAM), and a secondary memory 1010. The secondary memory 1010 includes, for example, a hard disk drive 1012 and/or a removable storage drive 1014, representing a floppy disk drive, a magnetic tape drive, a compact disk drive, etc. The removable storage drive 1014 reads from and/or writes to a removable storage unit 1018 in a well known manner.

Removable storage unit 1018, also called a program storage device or a computer program product, represents a floppy disk, magnetic tape, compact disk, etc. The removable storage unit 1018 includes a computer usable storage medium having stored therein computer software and/or data.

Computer programs (also called computer control logic) are stored in main memory and/or the secondary memory 1010. Such computer programs, when executed, enable the computer system 1000 to perform the features of the present invention as discussed herein. In particular, the computer programs, when executed, enable the processor 1004 to perform the features of the present invention. Accordingly, such computer programs represent controllers of the computer system 1000.

In another embodiment, the invention is directed to a computer program product comprising a computer readable medium having control logic (computer software) stored therein. The control logic, when executed by the processor 1004, causes the processor 1004 to perform the functions of the invention as described herein..

While other embodiments of the present invention are possible, such as using many more instruments in a test setup controlled by one Multi-Device Direct I/O object with more intricate test environment scenarios, the breadth and scope of the present invention should not be limited by any of the above-described embodiments, but should be defined only in accordance with the following claims and their equivalents.

What is claimed is:

1. A Multi-Device Direct I/O object that generates a script for a test set capable of testing a plurality of test instruments, comprising:

means for generating a plurality of transactions from the multi-device direct I/O object that are capable of controlling a plurality of instruments, wherein each transaction contains an instruction for controlling an instrument of the plurality of instruments;

means for generating a plurality of I/O transaction dialog boxes from the multi-device direct I/O object, wherein each dialog box is associated with a corresponding one of said transactions, each said dialog box comprising:

a device field which identifies the instrument to be controlled by said transaction; and an address field that identifies the address of the instrument to be controlled by said transaction; and means for generating a script within the multi-device direct I/O object for testing the plurality of instruments using the plurality of I/O transaction dialog boxes, wherein each said dialog box maps the instruction for the corresponding one of said transactions to the script.

2. The Multi-Device Direct I/O object of claim 1 wherein said I/O Transaction dialog box further comprises:

an operation field that identifies the specific operation to be performed by said transaction;

an input data field that identifies an instrument built-in command to be performed by said transaction;

a field that identifies the encoding of said instrument built-in command;

a data format field that identifies how data within said instrument built-in command is formatted;

means for accepting said fields for said transaction;

means for canceling said fields for said transaction; and means for performing a no operation of said fields for said transaction.

3. The Multi-Device Direct I/O object of claim 2, wherein said I/O Transaction dialog box further comprises an end-of-line (EOL) field that indicates an EOL character.

4. The Multi-Device Direct I/O object of claim 2 wherein said I/O Transaction dialog box further comprises:

a field that identifies the number of characters to be read by said transaction; and a field that identifies the size of the data to be read by said transaction.

5. The Multi-Device Direct I/O object of claim 3, wherein said object further comprises:

means for controlling the order in which said object executes.

means for switching said object between iconic and open view;

means for editing said object; and means for displaying title of said object.

6. The Multi-Device Direct I/O object of claim 1, wherein each dialog box maps the instruction for the corresponding one of said transactions to the script when a user selects an enter function of said dialog box.

7. The Multi-Device Direct I/O object of claim 1, wherein for each dialog box the user enters the instruction for the corresponding one of said transactions and the dialog box maps the instructions for the corresponding one of said transactions to the script when the user selects an enter function of said dialog box.

8. The Multi-Device Direct I/O object of claim 1, wherein the address field has a default address mode and an address mode, and in the default address mode the address field contains an address of a first instrument of the type specified by the device field and in the address mode a user can enter an address of a second instrument of the type specified by the device field and of the same type as the field instrument.

9. A Multi-Device Direct I/O object that generates a script for a test set capable of testing a plurality of test instruments, comprising:

means for generating a plurality of transactions that are capable of controlling a plurality of instruments, wherein each transaction contains an instruction for controlling an instrument of the plurality of instruments;

means for generating a plurality of I/O transaction dialog boxes, wherein each dialog box is associated with a corresponding one of said transactions, each said dialog box comprising:

a device field which identifies the instrument to be controlled by said transaction;

an address field that identifies the address of the instrument to be controlled by said transaction:

an operation field that identifies the specific operation to be performed by said transaction;

an input data field that identifies an instrument built-in command to be performed by said transaction;

a field that identifies the encoding of said instrument built-in command;

a data formal field that identifies how data within said instrument built-in command is formatted;

means for accepting said fields for said transaction;

means for canceling said fields for said transactions;

means for performing a no operation of said fields for said transaction;

a field that identifies the number of characters to be read by said transaction; and a field that identifies the size of the data to be read by said transaction;

means for generating a script for testing the plurality of instruments using the plurality of I/O transaction dialog boxes, wherein each said dialog box maps the instruction for the corresponding one of said transactions to the script;

means for controlling the order in which said object executes;

means for switching said object between iconic and open view;

means for editing said object; and means for displaying title of said object.

10. A method for generating a script for a test set capable of controlling many instruments using a Multi-Device Direct I/O object, said method steps comprising:

generating a plurality of transactions from the multi-device direct I/O object that are capable of controlling a plurality of instruments, wherein each transaction contains an instruction for controlling an instrument of the plurality of instruments;

generating a plurality of I/O transaction dialog boxes from the multi-device direct I/O object, wherein each dialog box is associated with a corresponding one of said transactions, each said dialog box comprising:

a device field which identifies the instrument to be controlled by said transaction; and an address field that identifies the address of the instrument to be controlled by said transaction;

generating a script within the multi-device direct I/O object for testing the plurality of instruments using the plurality of I/O transaction dialog boxes, wherein each said dialog box maps the instruction for the corresponding one of said transactions to the script; and executing said transactions within said script of said object in descending order.

11. The method of claim 7 wherein said I/O Transaction dialog box further comprises:

an operation field that identifies the specific operation to be performed by said transaction;

an input data field that identifies an instrument built-in command to be performed by said transaction;

a field that identifies the encoding of said instrument built-in command;

a data format field that identifies how data within said instrument built-in command is formatted;

means for accepting said fields for said transaction;

means for canceling said fields for said transaction; and means for performing a no operation of said fields for said transaction.

12. The method of claim 11 wherein said I/O Transaction dialog box further comprises an end-of-line (EOL) field that indicates an EOL character.

13. The method of claim 11 wherein said I/O Transaction dialog box further comprises:

a field that identifies the number of characters to be read by said transaction; and a field that identifies the size of the data to be read by said transaction.

14. The method of claim 10, wherein the step of generating the script is accomplished by the user for each dialog box entering the instruction for the corresponding one of said transactions and the dialog box mapping the instructions for the corresponding one of said transactions to the script when the user selects an enter function of said dialog box.

15. The method of claim 10, wherein the address field has a default address mode and an address mode, and in the default address mode the address field contains an address of a first instrument of the type specified by the device field and in the address mode a user enters an address of a second instrument of the type specified by the device field and of the same type as the field instrument.

16. A computer program product for use within a multi-processing, multi-programming computer environment, comprising:

a computer usable medium having computer readable graphical programming language code means embodied in said medium for a Multi-Device Direct I/O object that generates a script for a test set capable of testing a plurality of instruments, said computer program product having:

first computer readable graphical programming language code means for generating a plurality of transactions from the Multi-Device Direct I/O object that are capable of controlling the plurality of instruments, wherein each transaction contains an instruction for controlling an instrument of the plurality of instruments; and second computer readable graphical programming language code means for generating a plurality of I/O transaction dialog boxes from the Multi-Device Direct I/O object, wherein each dialog box is associated with a corresponding one of said transactions, each said dialog box comprising:

a device field which identifies the instrument to be controlled by said transaction; and an address field that identifies the address of the instrument to be controlled by said transaction; and third computer readable graphical programming language code means for generating a script within the Multi-Device Direct I/O object for testing the plurality of instruments using the plurality of I/O transaction dialog boxes, wherein each said dialog box maps the instruction for the corresponding one of said transactions to the script.

17. The computer program product of claim 16 wherein said I/O Transaction dialog box further comprises:

an operation field that identifies the specific operation to be performed by said transaction;

an input data field that identifies an instrument built-in command to be performed by said transaction;

a field that identifies the encoding of said instrument built-in command;

a data format field that identifies how data within said instrument built-in command is formatted;

means for accepting said fields for said transaction;

means for canceling said fields for said transaction; and means for performing a no operation of said fields for said transaction.

18. The computer program product of claim 17 wherein said I/O Transaction dialog box further comprises an end-of-line (EOL) field that indicates an EOL character.

19. The computer program product of claim 17 wherein said I/O Transaction dialog box further comprises:

a field that identifies the number of characters to be read by said transaction; and a field that identifies the size of the data to be read by said transaction.

20. The computer program product of claim 18 further comprising:

third computer readable graphical programming language code means for switching said object between iconic and open view;

fourth computer readable graphical programming language code means for editing said object;

fifth computer readable graphical programming language code means for displaying title of said object; and sixth computer readable graphical programming language code means for controlling the order in which said object executes.

21. The computer program product of claim 16, wherein the address field has a default address mode and an address mode, and in the default address mode the address field contains an address of a first instrument of the type specified by the device field and in the address mode a user enters an address of a second instrument of the type specified by the device field and of the same type as the field instrument.

22. A computer program product for use within a multi-processing, multi-programming computer environment, comprising:

a computer usable medium having computer readable graphical programming language code means embodied in said medium for a Multi-Device Direct I/O object that generates a script for a test set capable of testing a plurality of instruments, said computer program product having:

first computer readable graphical programming language code means for generating a plurality of transactions from the Multi-Device Direct I/O object that are capable of controlling the plurality of instruments, wherein each transaction contains an instruction for controlling an instrument of the plurality of instruments; and second computer readable graphical programming language code means for generating a plurality of I/O transaction dialog boxes from the Multi-Device Direct I/O object, wherein each dialog box is associated with a corresponding one of said transactions, each said dialog box comprising:

a device field which identifies the instrument to be controlled by said transaction;

an address field that identifies the address of the instrument to be controlled by said transaction;

an operation field that identifies the specific operation to be performed by said transaction;

an input data field that identifies an instrument built-in command to be performed by said transaction;

a field that identifies the encoding of said instrument built-in command;

a data formal field that identifies how data within said instrument built-in command is formatted;

means for accepting said fields for said transaction;

means for canceling said fields for said transactions;

means for performing a no operation of said fields for said transaction;

a field that identifies the number of characters to be read by said transaction; and a field that identifies the size of the data to be read by said transaction; and third computer readable graphical programming language code means for generating a script within the Multi-Device Direct I/O object for testing the plurality of instruments using the plurality of I/O transaction dialog boxes, wherein each said dialog box maps the instruction for the corresponding one of said transactions to the script;

third computer readable graphical programming language mode means for switching said object between iconic and open view;

fourth computer readable graphical programming language mode means for editing said object;

fifth computer readable graphical programming language mode means for displaying title of said object; and sixth computer readable graphical programming language mode means for controlling the order in which said object executes.

23. A program storage device readable by a machine, tangibly embodying a graphical programming language program of instruction executable by the machine to perform method steps within a multi-processing computer environment for a Multi-Device Direct I/O object that generates a script for a test set capable of testing a plurality of instruments, said method steps comprising:

generating a plurality of transactions from the Multi-Device Direct I/O object that are capable of controlling the plurality of instruments, wherein each transaction contains an instruction for controlling an instrument of the plurality of instruments;

generating a plurality of I/O transaction dialog boxes from the Multi-Device Direct I/O object, wherein each dialog box is associated with a corresponding one of said transactions, each said dialog box comprising:

a device field which identifies the instrument to be controlled by said transaction; and an address field that identifies the address of the instrument to be controlled by said transaction;

generating a script within the Multi-Device Direct I/O object for testing the plurality of instruments using the plurality of I/O transaction dialog boxes, wherein each said dialog box maps the instruction for the corresponding one of said transactions to the script; and executing said transactions within said script of said object in descending order.

24. The method of claim 23 wherein said I/O Transaction dialog box further comprises:

an operation field that identifies the specific operation to be performed by said transaction;

an input data field that identifies an instrument built-in command to be performed by said transaction;

a field that identifies the encoding of said instrument built-in command;

a data format field that identifies how data within said instrument built-in command is formatted;

means for accepting said fields for said transaction;

means for canceling said fields for said transaction; and means for performing a no operation of said fields for said transaction.

25. The method of claim 24 wherein said I/O Transaction dialog box further comprises an end-of-line (EOL) field that indicates an EOL character.

26. The method of claim 24 wherein said I/O Transaction dialog box further comprises:

a field that identifies the number of characters to be read by said transaction; and a field that identifies the size of the data to be read by said transaction.

27. The method of claim 23, wherein the step of generating the script is accomplished by the user for each dialog box entering the instruction for the corresponding one of said transactions and the dialog box mapping the instructions for the corresponding one of said transactions to the script when the user selects an enter function of said dialog box.

28. The method of claim 17, wherein the address field has a default address mode and an address mode, and in the default address mode the address field contains an address of a first instrument of the type specified by the device field and in the address mode a user enters an address of a second instrument of the type specified by the device field and of the same type as the field instrument.

* * * * *